May 3, 1949.  H. K. TABLER  2,469,019
FARM GATE
Filed May 18, 1945  3 Sheets-Sheet 1
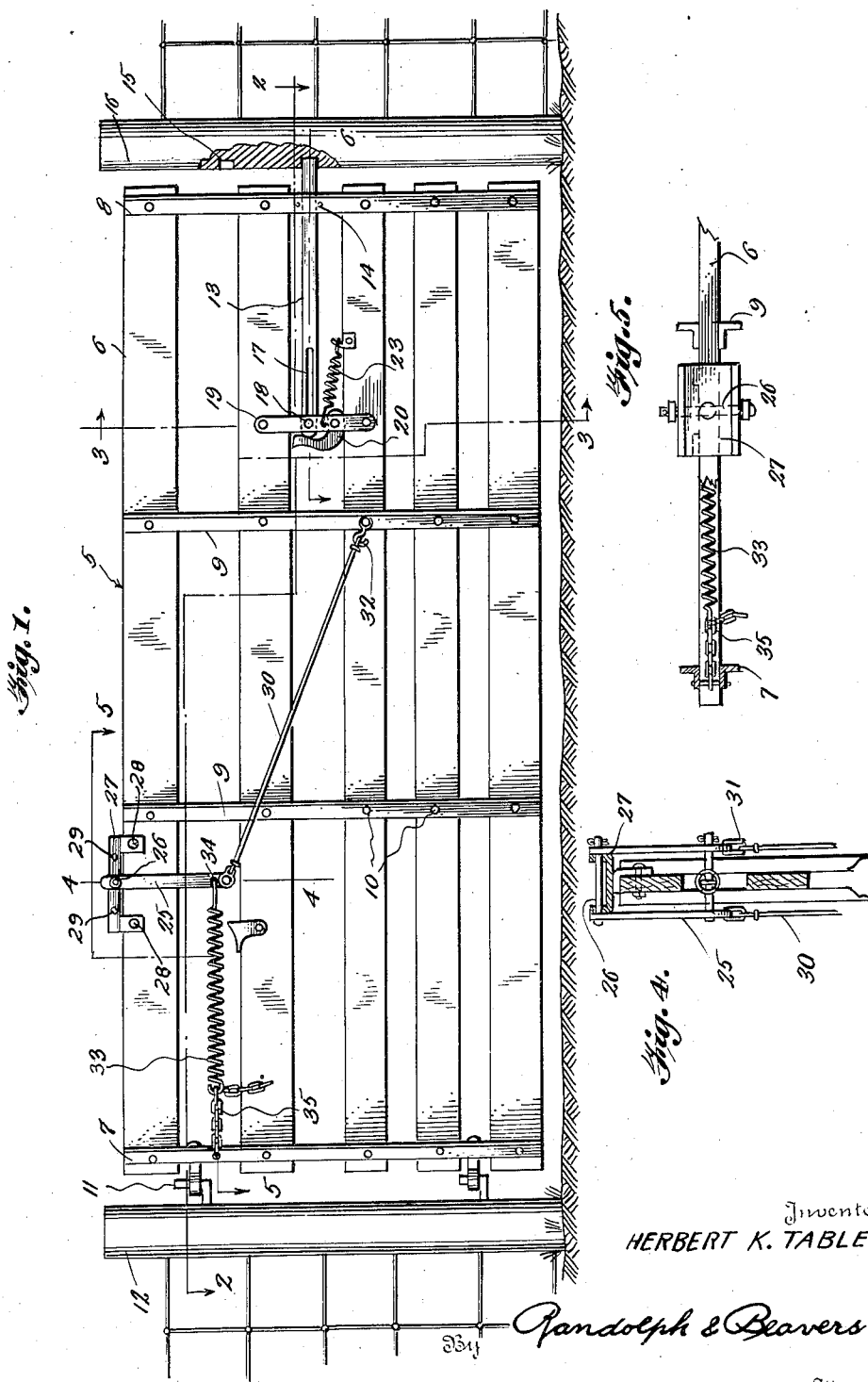
Inventor
HERBERT K. TABLER
By Randolph & Beavers
Attorney May 3, 1949.  H. K. TABLER  2,469,019
FARM GATE
Filed May 18, 1945  3 Sheets-Sheet 2
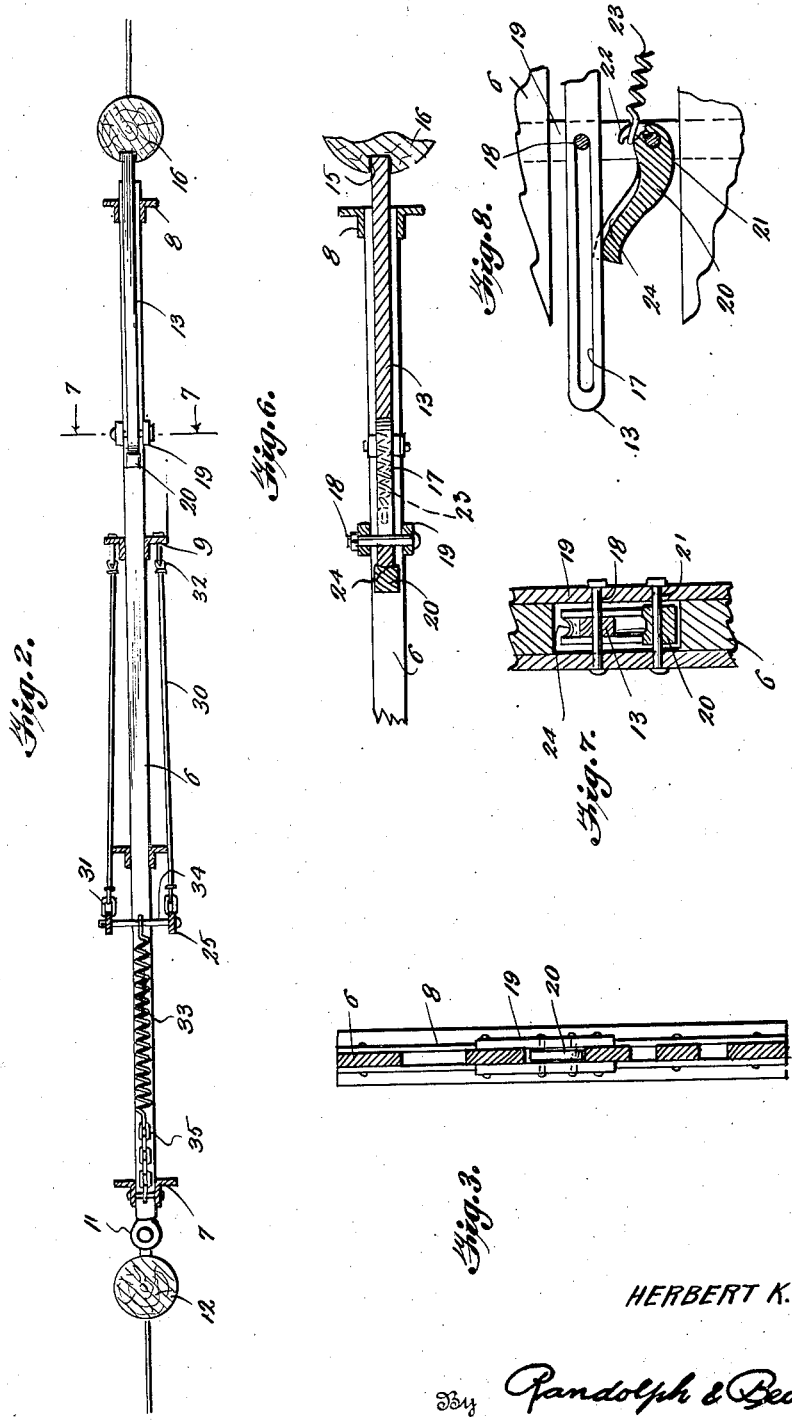
Inventor
HERBERT K. TABLER
By Randolph & Beavers
Attorney May 3, 1949.  H. K. TABLER  2,469,019
FARM GATE
Filed May 18, 1945  3 Sheets-Sheet 3
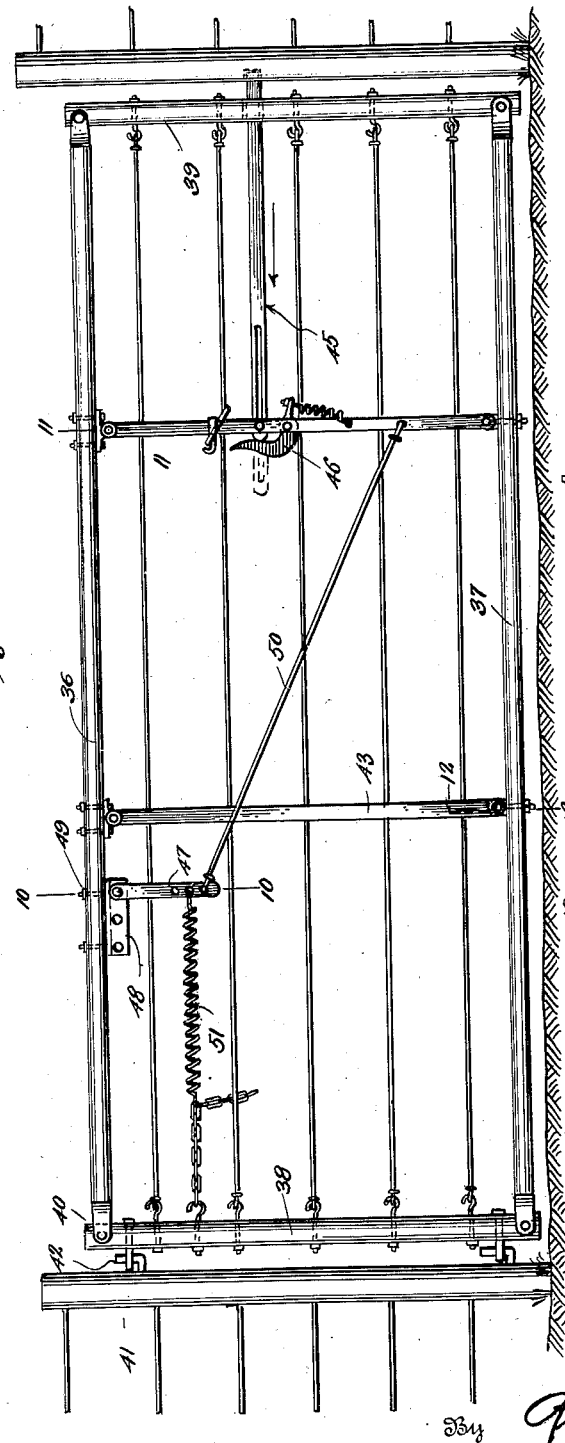
Inventor
HERBERT K. TABLER
By Randolph & Beavers
Attorney Patented May 3, 1949

2,469,019

UNITED STATES PATENT OFFICE 2,469,019

FARM GATE

Herbert K. Tabler, Plymouth, Ill., assignor to Imogene Tabler, Plymouth, Ill.

Application May 18, 1945, Serial No. 594,509

1 Claim. (Cl. 160—145)

The present invention relates to new and useful improvements in gates and more particularly to farm gates.

An important object of the invention is to provide a farm gate mounted for horizontal swinging movement and embodying means whereby the free end of the gate is adjustable vertically in accordance with the slope of the ground to position the lower edge of the gate parallel to the ground when in closed position.

Another object is to provide an improved safety ratch which prevents cattle from accidentally opening the gate by rubbing against the latch.

Another object of the invention is to provide a farm gate that is particularly suited to wide gateways needed for the passage of large machinery, such as combines, cornpickers and the like, and which may be operated with little effort.

A still further object is to provide a device of this character of simple and practical construction, which is strong and durable, efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a view in elevation illustrating one embodiment of the invention.

Figure 2 is a longitudinal sectional view taken substantially on a line 2—2 of Figure 1.

Figure 3 is a vertical sectional view taken substantially on a line 3—3 of Figure 1.

Figure 4 is a fragmentary vertical sectional view taken substantially on a line 4—4 of Figure 1.

Figure 5 is a fragmentary longitudinal sectional view taken substantially on a line 5—5 of Figure 1.

Figure 6 is a longitudinal sectional view of the latch taken on a line 6—6 of Figure 1.

Figure 7 is a similar view taken on a line 7—7 of Figure 2.

Figure 8 is an enlarged detail of the inner end of the latch bar with parts shown in section.

Figure 9 is a view in elevation of a modified gate construction, and

Figures 10, 11 and 12 are fragmentary vertical sectional views taken respectively on the lines 10—10, 11—11, and 12—12 of Figure 9.

Referring now to the drawings in detail, and first with respect to the form of the invention illustrated in Figures 1 to 8, inclusive, the numeral 5 designates the gate generally, which comprises a plurality of longitudinally extending rails 6 connected by end vertical bars 7 and 8 and intermediate bars 9.

The longitudinal rails and vertical bars are connected together through the medium of pivot pins and slots 10 whereby the gate is flexible in its nature in that the free end of the gate may be adjusted vertically.

The inner end of the gate is connected by a suitable type of hinge structure 11 attached to a supporting post 12, whereby the gate may swing horizontally into open and closed positions.

The opposite end of the gate is provided with a sliding latch bar 13 supported between a pair of vertically spaced guide pins 14 on the vertical bar 8, the outer end of the latch bar being adapted for insertion in notches 15 in the gate post 16.

The inner end of the latch bar is formed with a longitudinally extending slot 17 for slidably mounting the bar on a pin 18 carried by a pair of plates 19 secured to opposite sides of the rails 6.

The latch bar 13 is retained in its open or closed position by an upwardly curved lever 20 pivoted on a pin 21 adjacent its lower end between the bars 19 and with its upper end projecting upwardly behind the latch bar when the latter is in its projected position for locking the gate, as illustrated in Figure 1 of the drawings.

An upwardly projecting hook 22 is formed at the pivoted end of the lever and to which one end of a coil spring 23 is attached, the spring exerting its influence on the lever to urge the lever in an upright position behind the latch bar.

The front edge of the lever 20 is formed at its upper portion with a longitudinally extending groove 24 forming a guide for the lower edge of the latch bar during its locking and unlocking movement and when the latch bar is retracted in its unlocked position, the spring 23 will cause the free end of the lever 20 to bear against the underside of the latch bar to frictionally hold the same against accidental sliding movement and thus serve to secure the latch bar in its retracted position.

The free end of the gate 5 is secured in vertically adjusted position to compensate for variations in the slope of the ground by means of a pair of levers 25 positioned at opposite sides of the top rail 6 adjacent the pivoted end of the gate; the upper ends of the levers 25 being pivoted on a pin 26 extending transversely of the gate in a plate 27.

The plate 27 is secured to the upper edge of the gate 5 by means of bolts or the like 28, the plate extending longitudinally of the gate and being formed with longitudinally spaced openings 29 in which the pin 26 may be selectively positioned to move the levers 25 forwardly or rearwardly along the gate.

To the lower end of each of the levers 25 is attached a rod 30 by means of crevices or other swivel members 31, the rods 30 extending forwardly and downwardly of the gate and attached at their front ends to hooks 38 attached to one of the intermediate bars 9.

A coil spring 33 is also attached at one end to the lower ends of the levers 25 by means of a transverse pin 34 connecting the levers, the spring extending rearwardly of the gate and attached at its rear end to the inner vertical bar 7 through the medium of a chain 35, the links of the chain providing for the adjustment of the tension of the spring.

By adjusting the levers 25 forwardly or rearwardly on the upper edge of the gate, the front or outer end of the gate may be adjusted vertically to compensate for variations in the slope of the ground.

In the form of the invention illustrated in Figures 9 to 12, inclusive, the upper and lower rails 36 and 37, as well as the inner and outer vertical bars 38 and 39, are constructed of tubular members, the ends of the rails being pivoted to the vertical bars by means of pins 40.

The inner vertical bar 38 is swingably supported on a gate post 41 by means of a conventional hinge structure 42.

Intermediate vertical bars 43 are pivoted to the upper and lower rails by pins 44 and the outer end of the gate is provided with a sliding latch bar 45 and lever 46 similar to the construction of the latch bar and lever illustrated in Figure 1 of the drawings, and a pair of vertical adjusting levers 47 for the outer end of the gate are pivoted at their upper ends to a longitudinally extending plate 48 secured to the underside of the rail 36 by means of bolts 49.

Wires or rods 50 also connect the lower ends of the levers 47 with an intermediate vertical bar 43 and a coil spring 51 also extends rearwardly from the lower portion of the levers 47 similar to the spring provided for the adjusting levers 25 of the gate 5.

In the use of boards 6, it may be desirable to bore transverse openings through the ends and place bolts therethrough so as to prevent splitting of the boards at the ends.

It is believed the details of construction, operation and advantages of the gate, constructed in accordance with my invention, will be readily understood from the foregoing without further detailed explanation.

Changes in details may be resorted to without departing from the spirit of the invention or the scope of the appended claim.

Having thus described the invention, what I claim is:

A gate comprising longitudinal rails and vertical bars pivotally connected to the rails, means pivotally supporting one end of the gate for horizontal swinging movement, a longitudinally extending plate secured to the uppermost rail of the gate and having longitudinally spaced openings, a transversely extending pin selectively received in said openings, a lever pivoted at one end to said pin and extending downwardly therefrom, a member pivoted to the lower end of said lever and extending downwardly and toward the free end of the gate and attached at its opposite end to one of said uprights adjacent the free end of the gate, and a coil spring connecting the lower end of the lever to the hinged end of the gate.

HERBERT K. TABLER.

REFERENCES CITED

The following references are of record in the file of this patent:

UNITED STATES PATENTS

| Number | Name | Date |
|---|---|---|
| 447,659 | Buck | Mar. 3, 1891 |
| 1,280,665 | Clay | Oct. 8, 1918 |
| 1,707,373 | Tabler | Apr. 2, 1929 |